United States Patent
Yamagishi et al.

(10) Patent No.: US 11,309,599 B2
(45) Date of Patent: Apr. 19, 2022

(54) COOLING STRUCTURE OF VEHICLE BATTERY UNIT

(71) Applicant: HONDA MOTOR CO., LTD., Tokyo (JP)

(72) Inventors: Yosuke Yamagishi, Saitama (JP); Michihisa Tsutsumi, Saitama (JP); Hiroyuki Ozawa, Saitama (JP); Satoko Ito, Saitama (JP); Ryo Shinoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 16/875,218

(22) Filed: May 15, 2020

(65) Prior Publication Data
US 2020/0365959 A1 Nov. 19, 2020

(30) Foreign Application Priority Data
May 16, 2019 (JP) .............................. JP2019-093123

(51) Int. Cl.
*H01M 10/6567* (2014.01)
*H01M 10/613* (2014.01)
(Continued)

(52) U.S. Cl.
CPC ......... *H01M 10/6567* (2015.04); *B60L 58/18* (2019.02); *B60L 58/26* (2019.02);
(Continued)

(58) Field of Classification Search
CPC ...... B60L 3/0007; B60L 3/0046; B60L 50/64; B60L 50/66; B60L 58/18; B60L 58/26;
(Continued)

(56) References Cited

U.S. PATENT DOCUMENTS

| | | | | |
|---|---|---|---|---|
| 5,624,003 | A | * | 4/1997 | Matsuki .................. B60L 58/26 180/65.1 |
| 2014/0030560 | A1 | * | 1/2014 | Lev ......................... B60L 50/16 429/72 |

(Continued)

FOREIGN PATENT DOCUMENTS

| | | |
|---|---|---|
| EP | 3590748 A2 | 1/2020 |
| JP | 6064730 B2 | 1/2017 |
| WO | WO 2014/122904 A1 | 8/2014 |

OTHER PUBLICATIONS

Jan. 12, 2021, German Search Report issued for related DE Application No. 102020205929.2.

*Primary Examiner* — Adam A Arciero
(74) *Attorney, Agent, or Firm* — Paratus Law Group, PLLC

(57) ABSTRACT

A cooling structure of a vehicle battery unit includes: at least two battery modules; a battery cooling unit; an electric connection box; a battery case; a supply pipe; and a discharge pipe. The supply pipe includes: a first supply pipe portion passing between a battery module of the at least two battery modules, which is the battery module located on one side in a vehicle width direction, and the electric connection box; and a second supply pipe portion passing between the at least two battery modules. The discharge pipe includes: a first discharge pipe portion passing between a battery module of the at least two battery modules, which is the battery module located on the other side in the vehicle width direction, and the electric connection box; and a second discharge pipe portion passing between the at least two battery modules.

7 Claims, 5 Drawing Sheets

(51) Int. Cl.
 *B60L 58/18* (2019.01)
 *H01M 10/6556* (2014.01)
 *B60L 58/26* (2019.01)
 *H01M 10/625* (2014.01)

(52) U.S. Cl.
 CPC ....... *H01M 10/613* (2015.04); *H01M 10/625* (2015.04); *H01M 10/6556* (2015.04)

(58) Field of Classification Search
 CPC ............. H01M 10/425; H01M 10/613; H01M 10/625; H01M 10/6556; H01M 10/6567; H01M 10/6568; H01M 2220/20; H01M 50/204; H01M 50/249; H01M 50/284; Y02T 10/70
 See application file for complete search history.

(56) References Cited

U.S. PATENT DOCUMENTS

2016/0087319 A1\* 3/2016 Roh .................. H01M 10/6567
 429/62
2017/0305293 A1 10/2017 Takizawa et al.

\* cited by examiner

COOLING STRUCTURE OF VEHICLE BATTERY UNIT

CROSS-REFERENCE TO RELATED APPLICATIONS

The present application claims the benefit of priority of Japanese Patent Application No. 2019-093123, filed on May 16, 2019, the content of which is incorporated herein by reference.

TECHNICAL FIELD

The present invention relates to a cooling structure of a vehicle battery unit mounted on an electric vehicle or the like.

BACKGROUND ART

Japanese patent No. 6064730 describes a battery pack in which a plurality of battery modules are accommodated inside a case and a cooling module is arranged below the case. This cooling module includes a battery cooling unit having refrigerant passage through which a refrigerant passes, a supply pipe which is located on one side in a vehicle width direction and introduces the refrigerant to the battery cooling unit, and a discharge pipe which located on the other side in the vehicle width direction and discharges the refrigerant from the battery cooling unit.

However, the battery pack described in Japanese patent No. 6064730 has room for improvement in cooling efficiency because the cooling module is arranged outside the case. However, when the cooling module is arranged inside the case, a space for accommodating the battery module may be narrowed. Also, in the vehicle battery unit, there is a possibility that the load at the time of the vehicle side collision may be applied, and thus it is necessary to protect the supply pipe and the discharge pipe from the load at the time of the vehicle side collision.

SUMMARY

The invention provides a vehicle battery unit cooling structure which can improve space efficiency in a battery case while protecting a supply pipe and a discharge pipe from a load at the time of a vehicle side collision.

According to an aspect of the invention, there is provided a cooling structure of a vehicle battery unit including: at least two battery modules, arranged side by side in a vehicle width direction; a battery cooling unit, disposed below the at least two battery modules in a vertical direction, the battery cooling unit having a refrigerant passage through which refrigerant passes; an electric connection box, arranged on one side of the at least two battery modules in a front-rear direction; a battery case, accommodating the at least two battery modules, the battery cooling unit and the electric connection box; a supply pipe, accommodated in the battery case, the supply pipe configured to introduce refrigerant from the outside of the battery case to the battery cooling unit; and a discharge pipe, accommodated in the battery case, the discharge pipe configured to discharge the refrigerant from the battery cooling unit to the outside of the battery case, wherein: the supply pipe includes: a first supply pipe portion passing between a battery module of the at least two battery modules, which is the battery module located on one side in the vehicle width direction, and the electric connection box; and a second supply pipe portion passing between the at least two battery modules; and the discharge pipe includes: a first discharge pipe portion passing between a battery module of the at least two battery modules, which is the battery module located on the other side in the vehicle width direction, and the electric connection box; and a second discharge pipe portion passing between the at least two battery modules.

According to this invention, by arranging a supply pipe and a discharge pipe near a center of a battery unit in a vehicle width direction, not only can it be protected from a load at the time of vehicle side collision, but also space efficiency in a battery case can be improved.

DESCRIPTION OF EMBODIMENTS

Figure 1:
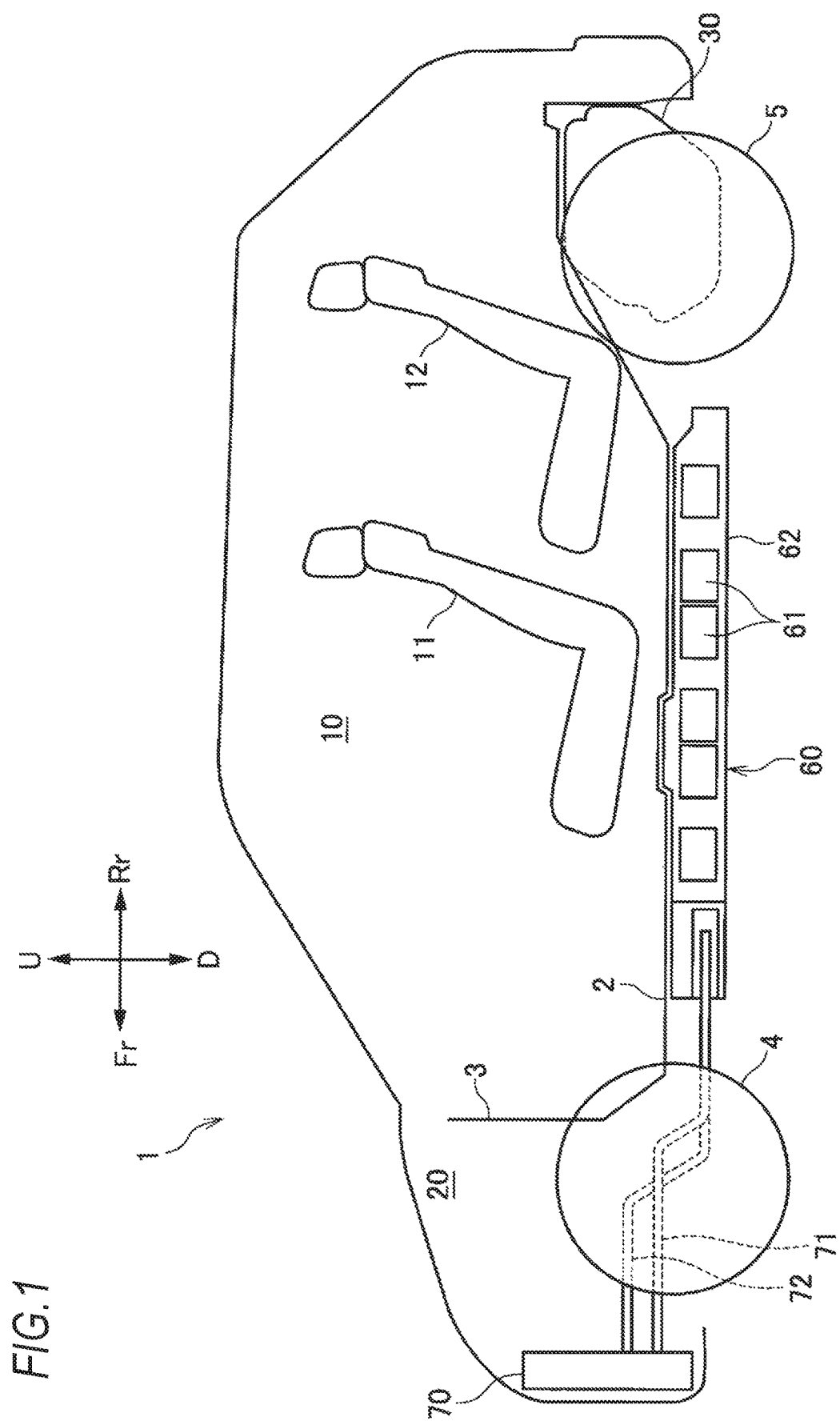
FIG. 1 is a schematic side view illustrating an entire structure of a vehicle on which a vehicle battery unit according to an embodiment of the invention is mounted.

Hereinafter, an embodiment of a cooling structure for a vehicle battery unit of the invention will be described with reference to the drawings. In addition, the drawings shall be viewed in the direction of reference letters, and in the following description, front and rear, left and right, up and down are described according to the direction viewed from an operator of a vehicle. In the drawings, the front of the vehicle is indicated by FR, the rear is indicated by Rr, the left side is indicated by L, the right side is indicated by R, the upper side is indicated by U, and the lower side is indicated by D.

Figure 2:
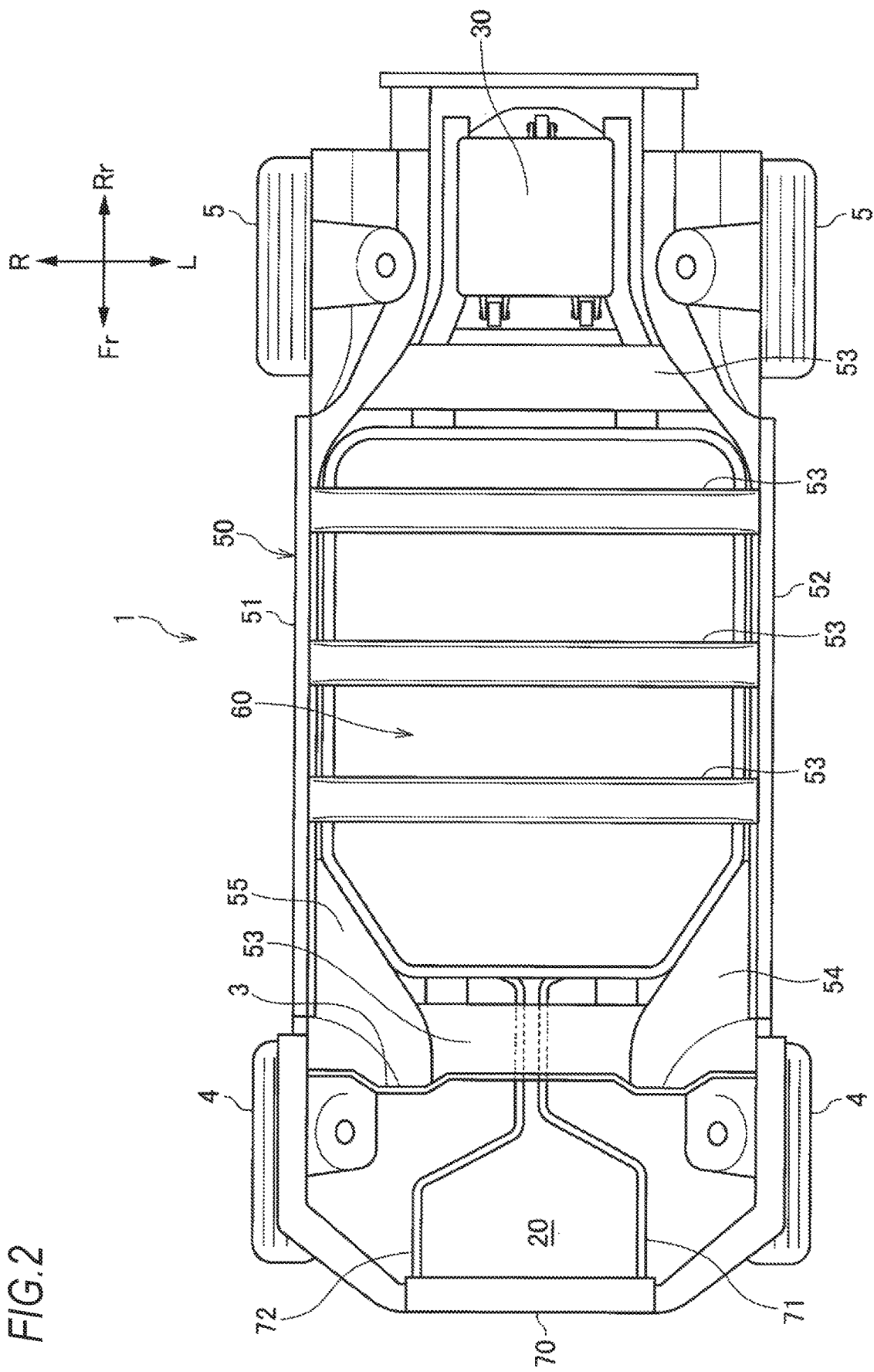
FIG. 2 is a plan view illustrating an underfloor structure of the vehicle in FIG. 1.

As illustrated in FIGS. 1 and 2, a vehicle 1 according to the embodiment of the invention is defined by a floor panel 2 and a dash panel 3 into a cabin 10 and a front room 20 in front of the cabin 10. The cabin 10 is provided with a front seat 11 and a rear seat 12. A drive device unit 30 is provided below the floor panel 2 behind the rear seat 12. The drive device unit 30 drives left and right rear wheels 5. That is, in the vehicle 1, the left and right rear wheels 5 are used as drive wheels and left and right front wheels 4 are used as driven wheels.

Below the cabin 10, a battery unit 60 is arranged. The battery unit 60 is configured by accommodating a plurality of battery modules 61 in a battery case 62 and is arranged below the floor panel 2 in the cabin 10.

A vehicle body frame 50 includes a pair of left and right side sills 51 and 52 extending in a front-rear direction and a plurality of cross members 53 extending in a left-right direction and connecting the side sills 51 and 52 to each other.

The drive device unit 30 includes an electric motor, a Power Control Unit (PCU) as an electric motor control device which controls the electric motor, and a power transmission mechanism which transmits the power of the electric motor to the rear wheels 5.

In the front room 20, a cooling device 70 for cooling the battery unit 60 and the like is provided. The cooling device 70 includes a radiator provided on the forefront of the vehicle 1. The cooling device 70 and the battery unit 60 are connected via an outer supply pipe 71 and an outer discharge pipe 72. An electric pump (not illustrated) is provided in the outer supply pipe 71 or the outer discharge pipe 72.

Figure 3:
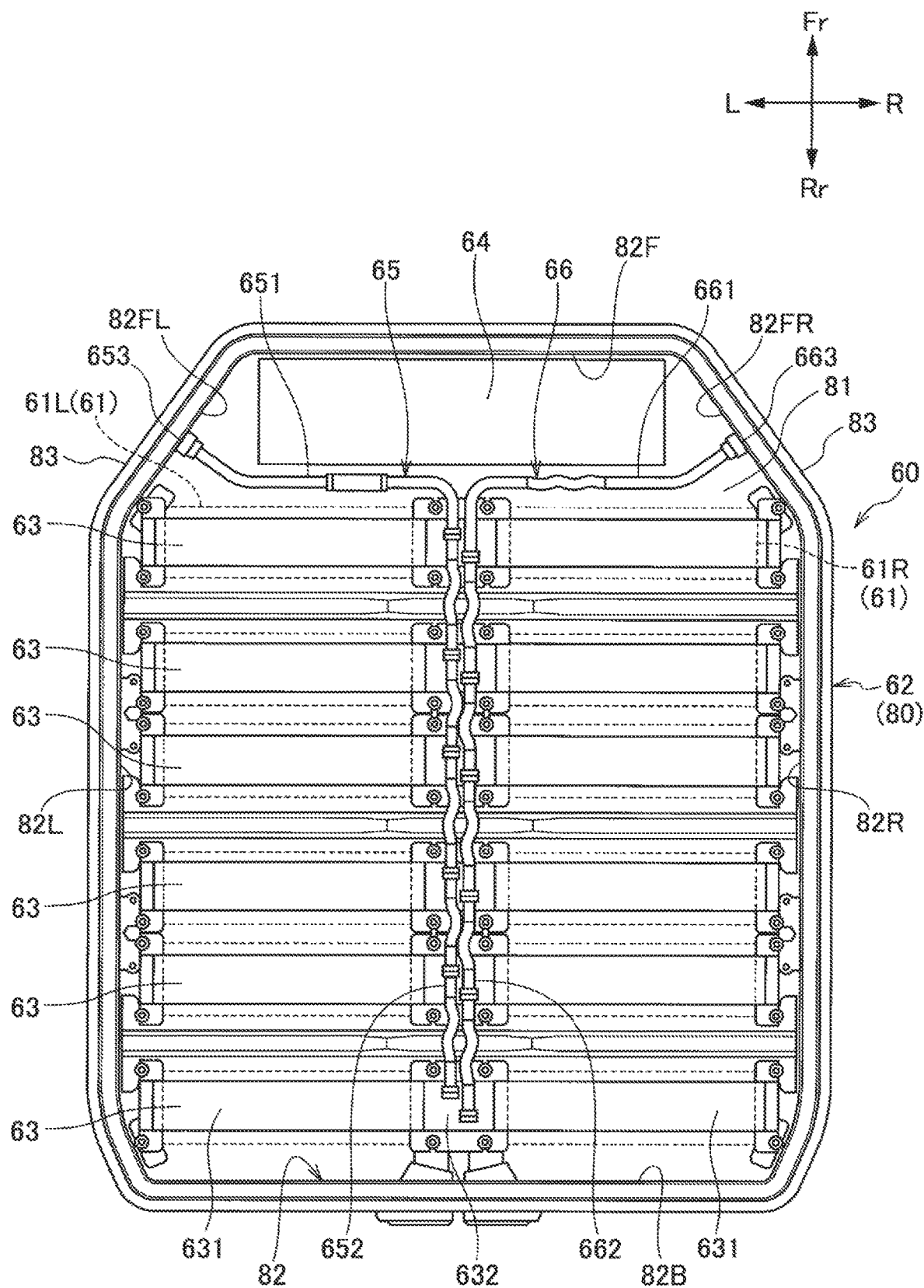
FIG. 3 is a plan view illustrating a cooling structure of the vehicle battery unit in FIG. 1.
Figure 4:
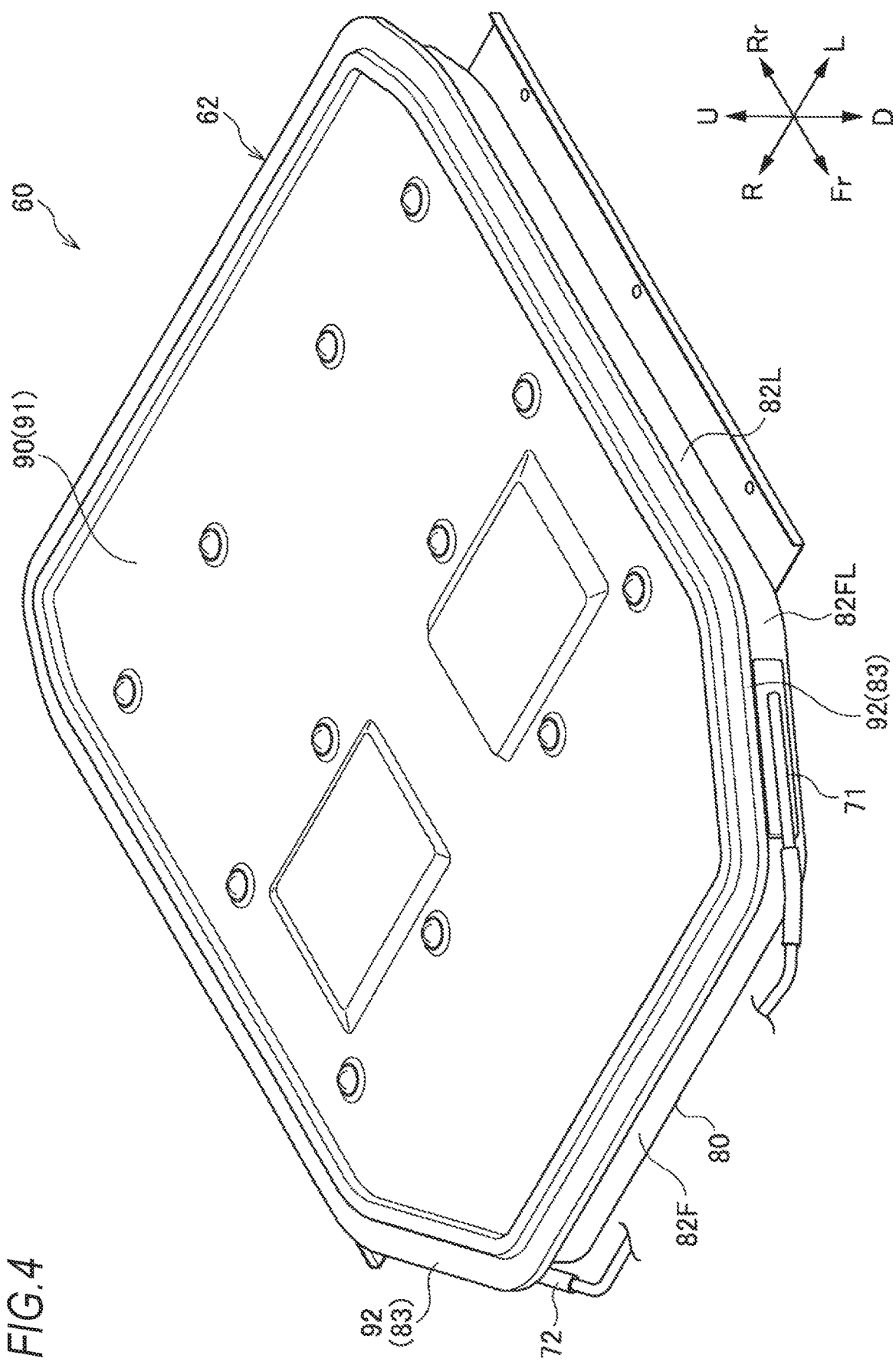
FIG. 4 is a perspective view of the vehicle battery unit in FIG. 1.
Figure 5:
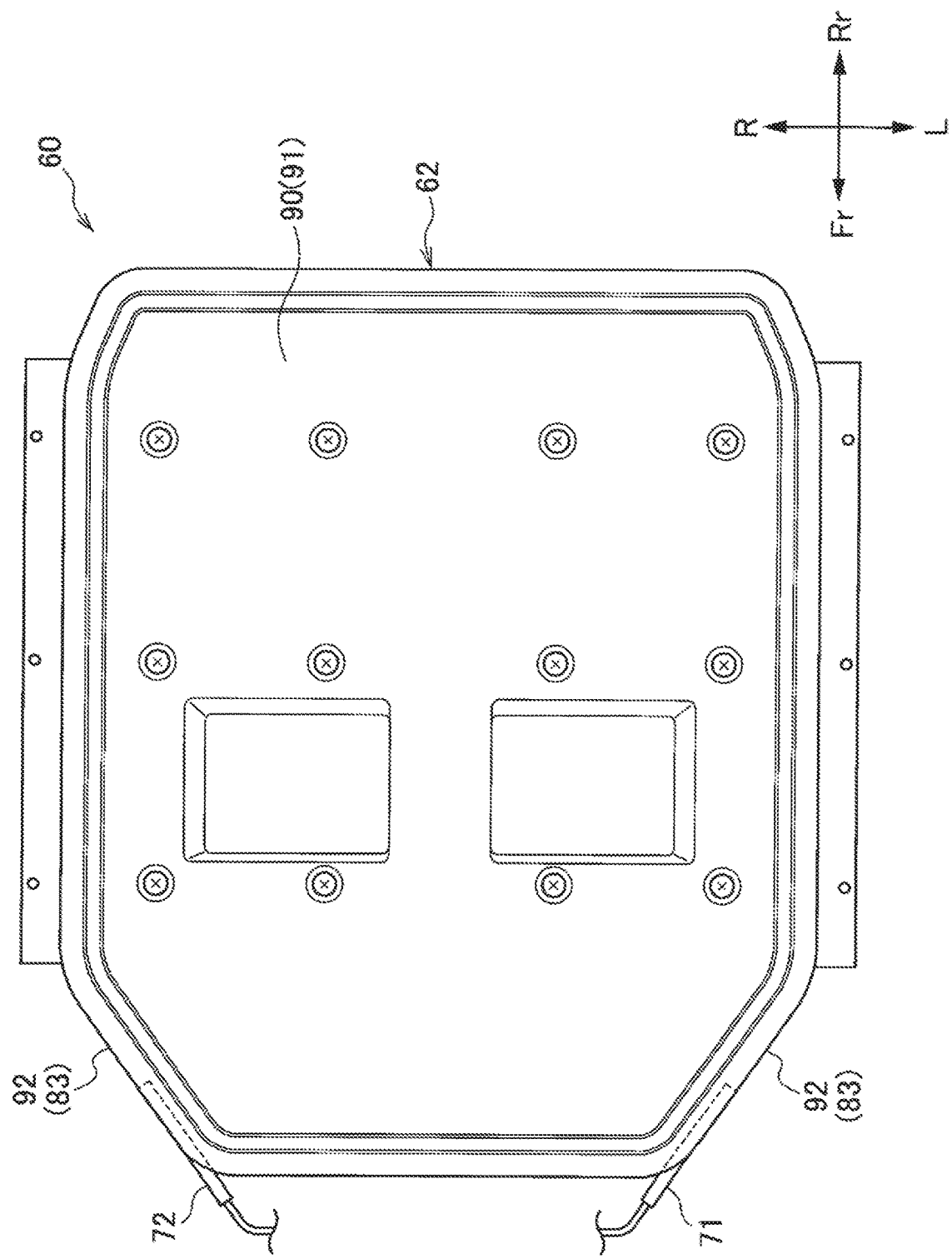
FIG. 5 is a plan view of the vehicle battery unit in FIG. 1.

Next, a main part of the invention, a certain battery unit 60 and its cooling structure will be described with reference to FIGS. 3 to 5.

The battery unit 60 includes a plurality of battery modules 61, a battery cooling unit 63 for cooling the battery module 61, an electric connection box 64 arranged on the front side of the battery module 61, a supply pipe 65 for introducing a refrigerant from outside the battery case 62 to the battery cooling unit 63, a discharge pipe 66 for discharging the refrigerant from the battery cooling unit 63 to the outside of the battery case 62, and the battery case 62 accommodating the battery module 61, the battery cooling unit 63, the electric connection box 64, the supply pipe 65, and the discharge pipe 66.

The plurality of battery modules 61 are arranged in the battery case 62 in the front-rear direction and the left-right direction. The battery unit 60 of the embodiment includes a total of twelve battery modules 61 arranged six in the front-rear direction and two in the left-right direction. In the following description, the six battery modules 61 located on the left side may be referred to as left battery modules 61L and the six battery modules 61 located on the right side may be referred to as right battery modules 61R.

The battery cooling unit 63 is disposed below the battery module 61 and has a refrigerant passage through which the refrigerant passes. In the battery unit 60 of the embodiment, since one battery cooling unit 63 cools two battery modules 61 arranged in the left-right direction, six battery cooling units 63 arranged in the front-rear direction are provided.

The battery cooling unit 63 includes a pair of cooling unit main bodies 631 arranged in a left-right direction and arranged below a pair of battery modules 61 arranged in the left-right direction and a pipe connection portion 632 provided between a pair of cooling unit main bodies 631 arranged in the left-right direction and connected to the supply pipe 65 and the discharge pipe 66. When the refrigerant is supplied from the supply pipe 65 to the pipe connection portion 632, the supplied refrigerant passes through a refrigerant passage formed inside the cooling unit main body 631, and is then discharged from the pipe connection portion 632 to the discharge pipe 66.

The electric connection box 64 accommodates a contact for disconnecting and connecting a conductive path of battery power, a current sensor for detecting a current of the battery power, a ground fault detecting circuit for detecting a ground fault of the battery module 61, and the like. The electric connection box 64 of the embodiment is located on the front side of a pair of battery modules 61 arranged in the front row and arranged in the left-right direction. The left end of the electric connection box 64 is located inside the left end of the left battery module 61L and the right end of the electric connection box 64 is located inside the right end of the right battery module 61R.

The battery case 62 includes a case body 80 accommodating the battery module 61, the battery cooling unit 63, the electric connection box 64, the supply pipe 65, and the discharge pipe 66 and a case lid portion 90 covering an upper opening of the case body 80.

The case body 80 includes a bottom portion 81, a side wall portion 82 rising from an outer edge of the bottom portion 81, and a flange portion 83 extending outward from the upper end of the side wall portion 82. The side wall portion 82 includes a left wall portion 82L and a right wall portion 82R facing each other in the left-right direction, a front wall portion 82F located on the front side of the electric connection box 64, a left inclined wall portion 82FL which connects the front wall portion 82F and the left wall portion 82L, a right inclined wall portion 82FR which connects the front wall portion 82F and the right wall portion 82R, and a rear wall portion 82B which connects rear ends of the left wall portion 82L and the right wall portion 82R. The left inclined wall portion 82FL and the right inclined wall portion 82FR face each other such that the left and right widths are gradually increased as it goes from the front wall portion 82F toward the rear side. The electric connection box 64 is accommodated in a space of which the left and right sides are interposed between the left and right inclined wall portions 82FL and 82FR and the battery module 61 is accommodated in a space of which the left and right sides are interposed between the left and right wall portions 82L and 82R.

The case lid portion 90 includes a lid body portion 91 which covers the upper opening of the case body 80 and a flange portion 92 which extends outward from a peripheral edge of the lid body portion 91. The flange portion 92 is overlapped with the flange portion 83 of the case body 80 and fastened via a plurality of bolts.

The supply pipe 65 includes a first supply pipe portion 651 passing between the electric connection box 64 and the left battery module 61L located in the front row and a second supply pipe portion 652 passing between the left and right battery modules 61. The discharge pipe 66 includes a first discharge pipe portion 661 passing between the electric connection box 64 and the right battery module 61R located in the front row and a second discharge pipe portion 662 passing between the left and right battery modules 61.

According to the arrangement of the supply pipe 65 and the discharge pipe 66, by arranging the supply pipe 65 and the discharge pipe 66 near the center of the battery unit 60 in a vehicle width direction, not only can it be protected from the load at the time of vehicle side collision, but also the space efficiency in the battery case 62 can be improved.

In particular, the first supply pipe portion 651 is arranged between the electric connection box 64 and the left battery module 61L located on the left side and the first discharge pipe portion 661 is arranged between the electric connection box 64 and the right battery module 61R located on the right side. In other words, the first supply pipe portion 651 and the first discharge pipe portion 661 are arranged in opposite directions. Therefore, the space efficiency in the battery case 62 can be further improved.

Further, the supply pipe 65 and the discharge pipe 66 are arranged at a position lower than the upper surface of the battery module 61 and the upper surface of the electric connection box 64. Thereby, the height of the battery unit 60 can be suppressed.

The supply pipe 65 and the discharge pipe 66 are arranged so that their heights are substantially constant. With this configuration, the accumulation of air in the pipe can be suppressed, so that it is not necessary to provide a breathing mechanism, and thus the structure can be simplified.

Also, an outer pipe connection portion 653 of the supply pipe 65 is joined to the left inclined wall portion 82FL of the battery case 62 and the outer pipe connection portion 663 of the discharge pipe 66 is connected to the right inclined wall portion 82FR of the battery case 62. In this way, at the time of a side collision, a load is applied to the left wall portion 82L or the right wall portion 82R before the outer pipe connection portions 653 and 663 of the pipes 65 and 66.

Therefore, the outer pipe connection portions 653 and 663 of the pipes 65 and 66 can be protected.

The outer pipe connection portion 653 of the supply pipe 65 is arranged outside the battery case 62 and is connected to the outer supply pipe 71 extending along the left inclined wall portion 82FL. The outer pipe connection portion 663 of the discharge pipe 66 is arranged outside the battery case 62 and is connected to the outer discharge pipe 72 extending along the right inclined wall portion 82FR. In this case, the outer supply pipe 71 extends along the left inclined wall portion 82FL and the outer discharge pipe 72 extends along the right inclined wall portion 82FR. As a result, in the event of a side collision, the outer supply pipe 71 and the outer discharge pipe 72 can also be protected.

Of the outer supply pipe 71 and the outer discharge pipe 72, at least a portion extending along the left inclined wall portion 82FL or right inclined wall portion 82FR is disposed below the flange portions 83 and 92 of the battery case 62 and inside the outer edges of the flange portions 83 and 92. In this way, the outer supply pipe 71 and the outer discharge pipe 72 can be more appropriately protected at the time of a side collision.

Also, as illustrated in FIG. 2, a left reinforcement member 54 which has a substantially triangular shape in a plan view is provided between the left side sill 51 and the left inclined wall portion 82FL of the battery case 62 and a right reinforcement member 55 which has a substantially triangular shape in a plan view is provided between the right side sill 52 and the right inclined wall portion 82FR of the battery case 62. In this way, the outer supply pipe 71 and the outer discharge pipe 72 can be more appropriately protected at the time of a side collision.

The embodiment described above can be appropriately modified, improved, and the like.

For example, in the embodiment described above, the supply pipe 65 is arranged on the left and the discharge pipe 66 is arranged on the right. However, the supply pipe 65 may be arranged on the right and the discharge pipe 66 may be arranged on the left. In the embodiment described above, the electric connection box 64 is arranged on the front side of the battery module 61. However, the electric connection box 64 may be arranged on the rear side of the battery module 61.

At least the following matters are described in this specification. In addition, although the corresponding components in the above-described embodiment are shown in parentheses, the invention is not limited to this.

(1) A cooling structure of a vehicle battery unit (battery unit 60) which includes at least two battery modules (battery modules 61) which is arranged side by side in a vehicle width direction, a battery cooling unit (battery cooling unit 63) which is disposed below the at least two battery modules in a vertical direction and has a refrigerant passage through which refrigerant passes, an electric connection box (electric connection box 64) which is arranged on one side of the at least two battery modules in a front-rear direction, a battery case (battery case 62) which accommodates the at least two battery modules, the battery cooling unit, and the electric connection box, a supply pipe (supply pipe 65) which is accommodated in the battery case and introduces refrigerant from the outside of the battery case to the battery cooling unit, and a discharge pipe (discharge pipe 66) which is accommodated in the battery case and discharges the refrigerant from the battery cooling unit to the outside of the battery case, where the supply pipe includes, a first supply pipe portion (first supply pipe portion 651) passing between a battery module (left battery module 61L) of the at least two battery modules, which is the battery module located on one side in the vehicle width direction, and the electric connection box and a second supply pipe portion (second supply pipe portion 652) passing between the at least two battery modules, and the discharge pipe includes a first discharge pipe portion (first discharge pipe portion 661) passing between a battery module (right battery module 61R) of the at least two battery modules, which is the battery module located on the other side in the vehicle width direction, and the electric connection box and a second discharge pipe portion (second discharge pipe portion 662) passing between the at least two battery modules.

According to (1), the supply pipe includes the first supply pipe portion passing between the electric connection box and the battery module of the at least two battery modules, which is the battery module located on one side in the vehicle width direction, and the second supply pipe portion passing between the at least two battery modules and the discharge pipe includes the first discharge pipe portion passing between the electric connection box and the battery module of the at least two battery modules, which is the battery module located on the other side in the vehicle width direction and the second discharge pipe portion passing between the at least two battery modules. As a result, by arranging the supply pipe and the discharge pipe near the center of the battery unit in the vehicle width direction, it is possible to protect from the load at the time of the vehicle side collision. In addition, since the first supply pipe portion and the first discharge pipe portion are arranged in opposite directions, the space efficiency in the battery case can be improved.

(2) The cooling structure of the vehicle battery unit according to (1), where the supply pipe and the discharge pipe are arranged at a position lower than an upper surface of the at least two battery modules and an upper surface of the electric connection box.

According to (2), since the supply pipe and the discharge pipe are arranged at the position lower than the upper surfaces of at least two battery modules and the upper surface of the electric connection box, the height of the battery unit can be reduced.

(3) The cooling structure of the vehicle battery unit according to (1) or (2), where the battery case has a bottom portion (bottom portion 81) and a side wall portion (side wall portion 82) rising from an outer edge of the bottom portion, the side wall portion includes, a left wall portion (left wall portion 82L) and a right wall portion (right wall portion 82R) which face each other in the vehicle width direction, a first side wall portion (front wall portion 82F) located on the one side of the electric connection box in the front-rear direction, a first inclined wall portion (left inclined wall portion 82FL) connecting the first side wall portion and the left wall portion, and a second inclined wall portion (right inclined wall portion 82FR) connecting the first side wall portion and the right wall portion, the first inclined wall portion and the second inclined wall portion are arranged to face each other such that a gap in the vehicle width direction gradually increases as it goes from the first side wall portion toward the other side in the front-rear direction, one of the supply pipe and the discharge pipe is connected to the first inclined wall portion, and the other of the supply pipe and the discharge pipe is connected to the second inclined wall portion.

According to (3), one of the supply pipe and the discharge pipe is connected to the first inclined wall portion and the other of the supply pipe and the discharge pipe is connected to the second inclined wall portion. Therefore, at the time of a side collision, a load is applied to the left wall portion or the right wall portion before the connection portion of the pipe, so that the connection portion of the pipe can be protected.

(4) The cooling structure of the vehicle battery unit according to (3), where one (supply pipe 65) of the supply pipe and the discharge pipe is connected to a first outer pipe (outer supply pipe 71) which is disposed outside the battery case and extends along the first inclined wall portion, and the other (discharge pipe 66) of the supply pipe and the discharge pipe is connected to a second outer pipe (outer discharge pipe 72) which is disposed outside the battery case and extends along the second inclined wall portion.

According to (4), the first outer pipe extends along the first inclined wall portion and the second outer pipe extends along the second inclined wall portion. Therefore, In the event of a side collision, the first outer pipe and the second outer pipe can also be protected.

(5) The cooling structure of the vehicle battery unit according to (4), where a first flange portion (flange portion 83) is provided on the first inclined wall portion, a second flange portion (flange portion 83) is provided on the second inclined wall portion, the first outer pipe is disposed below the first flange portion and inside an outer edge portion of the first flange portion, and the second outer pipe is disposed below the second flange portion and inside an outer edge portion of the second flange portion.

According to (5), the first outer pipe is disposed below the first flange portion and inside the outer edge portion of the first flange portion and the second outer pipe is disposed below the second flange portion and inside the outer edge portion of the second flange portion. Therefore, in the event of a side collision, the first outer pipe and the second outer pipe can be more appropriately protected.

(6) The cooling structure of the vehicle battery unit according to any one of (3) to (5), where a first reinforcement member (first reinforcement member 54) is provided between a left side sill (left side sill 51) and the first inclined wall portion, and a second reinforcement member (second reinforcement member 55) is provided between a right side sill (right side sill 52) and the second inclined wall portion.

According to (6), since the first reinforcement member is provided between the left side sill and the first inclined wall portion, the first outer pipe can be more appropriately protected. In addition, since the second reinforcement member is provided between the right side sill and the second inclined wall portion, the second outer pipe can be more appropriately protected.

(7) The cooling structure of the vehicle battery unit according to any one of (1) to (6), where the supply pipe and the discharge pipe are arranged such that the heights are substantially constant.

According to (7), the supply pipe and the discharge pipe are arranged such that their heights are substantially constant, so that accumulation of air in the pipes can be suppressed. Accordingly, it is not necessary to provide a breathing mechanism, and thus the structure can be simplified.

The invention claimed is:

1. A cooling structure of a vehicle battery unit comprising:
at least two battery modules, arranged side by side in a vehicle width direction;
a battery cooling unit, disposed below the at least two battery modules in a vertical direction, the battery cooling unit having a refrigerant passage through which refrigerant passes;
an electric connection box, arranged on one side of the at least two battery modules in a front-rear direction;
a battery case, accommodating the at least two battery modules, the battery cooling unit and the electric connection box;
a supply pipe, accommodated in the battery case, the supply pipe configured to introduce refrigerant from the outside of the battery case to the battery cooling unit; and
a discharge pipe, accommodated in the battery case, the discharge pipe configured to discharge the refrigerant from the battery cooling unit to the outside of the battery case, wherein:
the supply pipe includes:
a first supply pipe portion passing between a battery module of the at least two battery modules, which is the battery module located on one side in the vehicle width direction, and the electric connection box; and
a second supply pipe portion passing between the at least two battery modules; and
the discharge pipe includes:
a first discharge pipe portion passing between a battery module of the at least two battery modules, which is the battery module located on the other side in the vehicle width direction, and the electric connection box; and
a second discharge pipe portion passing between the at least two battery modules.

2. The cooling structure of the vehicle battery unit according to claim 1, wherein
the supply pipe and the discharge pipe are arranged at a position lower than an upper surface of the at least two battery modules and an upper surface of the electric connection box.

3. The cooling structure of the vehicle battery unit according to claim 1, wherein:
the battery case has a bottom portion and a side wall portion rising from an outer edge of the bottom portion;
the side wall portion includes:
a left wall portion and a right wall portion which face each other in the vehicle width direction;
a first side wall portion located on the one side of the electric connection box in the front-rear direction;
a first inclined wall portion connecting the first side wall portion and the left wall portion; and
a second inclined wall portion connecting the first side wall portion and the right wall portion;
the first inclined wall portion and the second inclined wall portion are arranged to face each other such that a gap in the vehicle width direction gradually increases as it goes from the first side wall portion toward the other side in the front-rear direction;

one of the supply pipe and the discharge pipe is connected to the first inclined wall portion; and the other of the supply pipe and the discharge pipe is connected to the second inclined wall portion.

4. The cooling structure of the vehicle battery unit according to claim 3, wherein:

one of the supply pipe and the discharge pipe is connected to a first outer pipe which is disposed outside the battery case and extends along the first inclined wall portion; and the other of the supply pipe and the discharge pipe is connected to a second outer pipe which is disposed outside the battery case and extends along the second inclined wall portion.

5. The cooling structure of the vehicle battery unit according to claim 4, wherein:

a first flange portion is provided on the first inclined wall portion;

a second flange portion is provided on the second inclined wall portion;

the first outer pipe is disposed below the first flange portion and inside an outer edge portion of the first flange portion; and the second outer pipe is disposed below the second flange portion and inside an outer edge portion of the second flange portion.

6. The cooling structure of the vehicle battery unit according to claim 3, wherein:

a first reinforcement member is provided between a left side sill and the first inclined wall portion; and a second reinforcement member is provided between a right side sill and the second inclined wall portion.

7. The cooling structure of the vehicle battery unit according to claim 1, wherein the supply pipe and the discharge pipe are arranged such that the heights are substantially constant.

\* \* \* \* \*